Feb. 27, 1968 CHRISTIAN-CHARLES CROVELLA 3,371,161

METHOD OF ELECTRONIC STABILIZATION OF THE IMAGE OBTAINED WITH A TELEVISION CAMERA RIGIDLY INSTALLED ON A MOVING SUPPORT

Filed March 23, 1964 3 Sheets-Sheet 1

Inventor
Christian Charles Crovella
By
Karl W. Flocke
Attorney

Inventor
Christian Charles Crovella
By
[signature]
Attorney

Inventor
Christian Charles Crovella
By
Karl W. Flocks
Attorney

United States Patent Office 3,371,161

Patented Feb. 27, 1968

3,371,161

METHOD OF ELECTRONIC STABILIZATION OF THE IMAGE OBTAINED WITH A TELEVISION CAMERA RIGIDLY INSTALLED ON A MOVING SUPPORT

Christian-Charles Crovella, Antony, France, assignor to Nord-Aviation Societe Nationale de Constructions Aeronautiques, Paris, France, a joint-stock company of France Filed Mar. 23, 1964, Ser. No. 353,725

Claims priority, application France, Mar. 28, 1963, 929,643

5 Claims. (Cl. 178—7.2)

The present invention relates to a method and an apparatus corresponding thereto, for electronically stabilizing the image obtained with a television camera rigidly mounted on a support and directed on the object, the image of which it is desired to reproduce.

Theoretically, the support and in consequence the optical axis of the camera moves along a straight line trajectory. In practice, the support deviates more or less with respect to this ideal straight-line trajectory.

If the support is constituted by an aircraft, the longitudinal axis of which coincides with the displacement axis of the said support and if there is attached to it a system or orthogonal axes representing respectively the pitching axis, the rolling axis and the yawing axis of the aircraft, it can be said in a general way that any difference between the real trajectory and the ideal trajectory can be decomposed into a movement of translation along each of the axes and a rotation about the same axes.

If these movements of translation have a repercussion on the centering of the image, they do not adversely affect the stability as do the relative movements of rotation between the camera fixed to its support and the object to be filmed about the axes of pitching, rolling and yawing.

The problem of stabilization presents itself whenever a television camera or an image tube is mounted on a moving support, since it is in fact essential to eliminate these relative movements of rotation.

Up to the present time, this problem has been more or less satisfactory resolved by mounting on a stabilized platform, either the camera itself or the systems of prisms or mirrors which form the image.

All these devices are heavy, complicated and bulky, especially if it is necessary to correct a rotation of the image through 360°.

The absorption of the light rays in the optical correction devices has a very adverse influence on the quality of the image.

Finally, it should be observed that the overall dimensions of the optical correction device become greater as the desired size of the image itself becomes greater.

The present invention has for its object a method and the apparatus corresponding thereto for obtaining the same results, but in a simpler manner, while eliminating the drawbacks experienced at the present time.

According to the invention, the method of stabilizing a television image or the image of an electronic image tube, obtained with a camera rigidly fixed on a support which is movable in the direction of the object to be reproduced, the optical axis of the camera and the axis of the moving support being practically coincident, consists in measuring the relative movements of rotation between the camera fixed to its support and the object to be filmed by using a detecting member of roll angles coupled to the said support, stabilized vertically and in the direction of the object of which the image is to be reproduced, and in correcting the electronic image by deflecting the electronic beam through an angle equal to and in the opposite sense to the deflection of the axis of the support with respect to that of the said stabilized detecting member.

The apparatus for carrying into effect the method according to the invention comprises a member coupled to the support of the camera and stabilized vertically and in the direction of the object to be reproduced by a gyroscopic reference in order to detect and measure the angles of pitching, rolling and yawing, the axes of pitching, rolling and yawing being attached in a conventional manner to the said support, the rolling axis coinciding with the optical axis of the camera, detecting members of pitching angles and yawing angles at one of the extremities of the pitching axis and of the yawing axis supplying electric signals which correspond respectively to the pitching angle and the yawing angle of the said support, the said signal being applied to the corresponding deflection devices of the electronic beam, a magnet stabilized at a distance, practically in a vertical plane perpendicular to the fixed direction of the support by the gyroscopic reference acting at a distance on a resolver receiving at its input two saw-toothed signals respectively at line frequency and at image frequency for controlling the scanning beam and supplying, after passing through a summation amplifier for one and through a differential amplifier for the other, signals corresponding respectively to the components of pitching and yawing of the rolling correction, these two components being applied to the corresponding deflection members of the electronic beam.

Other characteristic features and advantages will become apparent from the description which follows below of preferred forms of embodiment of the invention, reference being made to the accompanying drawings, in which FIG. 1 represents the support of the camera with its axes of pitching, rolling and yawing;

Figures 1, 2:
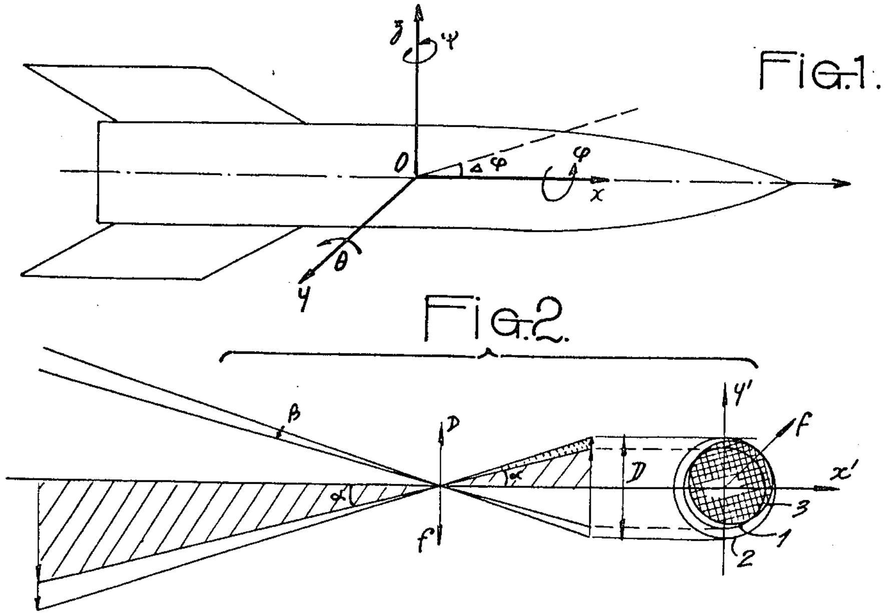
FIG. 2 shows the ratio between the total surface area of the sensitive layer of a television camera tube and the surface area of the said layer corresponding to the image.

In FIG. 1, the camera support is shown diagrammatically its axis coincident with the optical axis of the camera, directed on the object which it is desired to reproduce. A system of axes O $x$ $y$ $z$ is coupled to the said support, the axes O$x$, O$y$, O$z$ representing respectively its rolling, pitching and yawing axes and the rotation about these axes representing respectively the angles of rolling $\varphi$, of pitching $\theta$, and yawing $\psi$. These are the movements resulting from the rotations $\varphi$, $\theta$, and $\psi$ which it is desired to correct.

FIG. 2 shows that the surface of the sensitive layer of a television camera tube must be greater than that necessary for the formation of the image when the camera is fixed. In fact, the orientation of the electronic beam having an opening 2 at the summit, scanning the image, should be capable of varying by an angle $\beta$ about the axis of rolling O$x$. This angle $\beta$ is determined by the maximum amplitude provided for the corrections in pitching and yawing. The summit referred to above is the summit of the angle defining the cone having the base 1 or 3 (image), D being the diameter of base 2 (total surface area of the sensitive coating (FIG. 2). The value of the opening of this angle is therefore $2\alpha$.

In FIG. 2, the right-hand portion of which represents the folding-back on the plane of the drawing, of the plane $O'x'y'$ of the image projected on the television camera, parallel to the plane $Oyz$, the circle 1 represents the normal image without correction; the circle 2 having a diameter D, represents the total surface area of the sensitive coating and the circle 3 is the image after correction of the maximum displacement in the direction of the arrow $f$.

Figure 3:
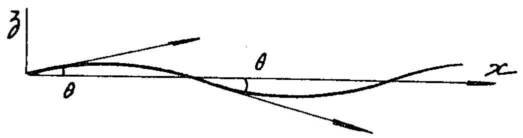
FIG. 3 represents the projection of the trajectory of a point of the support on the plane O$xz$.

In FIG. 3, there have been shown the variations of the angle of rotation in pitching of the support in the direction of the object to be reproduced.

Figure 4:
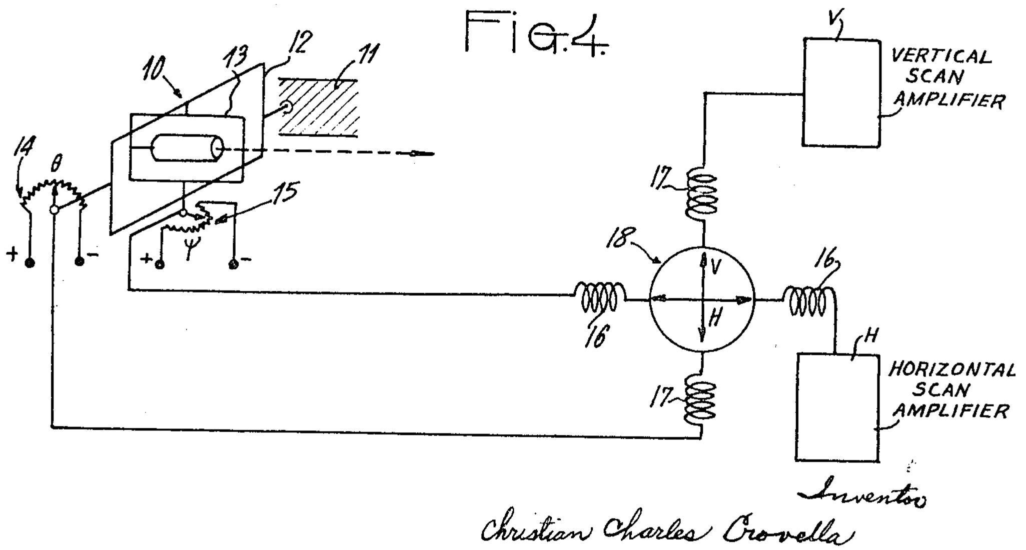
FIG. 4 shows the device for correction of pitching and yawing.

FIG. 4 represents the portion of the device which effects the pitching corection $\theta$ and the yawing correction $\psi$. A directional gyroscope 10 is mounted on the support 11 through the intermediary of two cardan rings 12 and 13, so that the angles of rotation of these two cardan rings are respectively the pitching angle $\theta$ and the yawing angle $\psi$ of the support 11. These angles are converted to electric signals by the potentiometers 14 and 15, the windings of which, under direct-current voltage, are rigidly fixed to the frame of the gyroscope, while the sliders are each coupled to the axis of the corresponding cardan ring. The direct-current signals obtained from the potentiometers 14 and 15 are brought to the horizontal deflection coils 16 and the vertical deflection coils 17 of the television camera tube 18 at the same time as the line voltage frequency and image voltage frequency are supplied respectively by amplifiers H and V.

Figure 5:
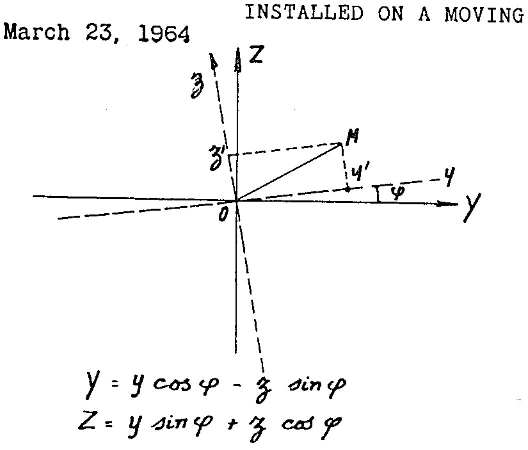
FIG. 5 illustrates the principle of the correction for rolling.

The principle which enables the correction of the rolling to be obtained, in the case of a scanned optical image of the object to be picked up in the form of a rectangle, is shown in FIG. 5, in which M represents a point of the optical image analyzed in rectangular coordinates $y'$, $z'$ by the camera's electronic beam in the plane which contains the pitching and yawing axes $Oy$ and $Oz$ of the support as mentioned above. The plane $Oy'z'$ coincides with the plane of the fixed axes OY and OZ.

In this FIG. 5, in which the axes OY and OZ belong to a fixed reference trihedral, $$Y = y \cos\varphi - z \sin\varphi$$
$$Z = y \sin\varphi + z \cos\varphi$$

or, if $V_1$ is the line voltage and $V_1$ is the image voltage, $$V_Y = V_1 \cos\varphi - V_1 \sin\varphi$$
$$V_Z = V_1 \cos\varphi + V_1 \sin\varphi$$

The above voltages $V_y$ and $V_z$ are obtained with a known resolver called the "Halltron resolver" which operates according to the following principle: it is known that a Hall cell receiving an electric current and subjected to the action of a magnetic field of constant intensity provides an output voltage which is a function of the intensity of the input current and of the angle between the constant magnetic field and the plane of the cell.

A Hall cell being placed in the plane XOY, orientated along the axis OY, subjected to the action of a constant magnetic field $\beta$ rotating in the plane YOZ around the point O and forming with the axis OY an angle $\varphi$, the output voltage of the said cell is equal to $KI_e \sin\varphi$, where $I_e$ is the intensity of the input current and K is a constant. If the cell is placed in the plane XOZ and orientated along the axis OZ, the same rotating magnetic field $\beta$ produces an output voltage equal to $KI_e \cos\varphi$.

By arranging two groups of two Hall cells disposed as above, one of these groups being supplied by the sawtooth signal at line frequency, the other by the sawtooth signal at image frequency, there are thus obtained the voltages $V_1 \sin\varphi$, $V_1 \cos\varphi$, $V_1 \sin\varphi$, and $V_1 \cos\varphi$. The equations combining these voltages to form $V_y$ and $V_Z$ illustrate the law which is to be satisfied to obtain the correction of the rolling. Angle $\varphi$, being given by the gyroscopic means, is translated into electrical signal by means of the Halltron resolver. This device is already known and applies the Hall effect. Briefly, a sawtooth current is applied to the electrodes of a Hall cell. By means of a rotating magnetic field a signal is obtained and this signal will modulate said sawtooth current with a sinusoidal current. In fact, there is provided two sawtooth currents, corresponding to the vertical and horizontal analysis signals, which present a phase difference of 90° in synchronism with the frequency of the rotation. This phase difference is given by the position of two Hall cells in the reference magnetic field giving $\cos\varphi$ and $\sin\varphi$. The parameters $y$ and $z$ of said equations therefore represent voltages and they become $V_1$ and $V_1$ respectively, that is, the horizontal voltage (lines) and the vertical voltage (image) of analysis.

Figure 6:
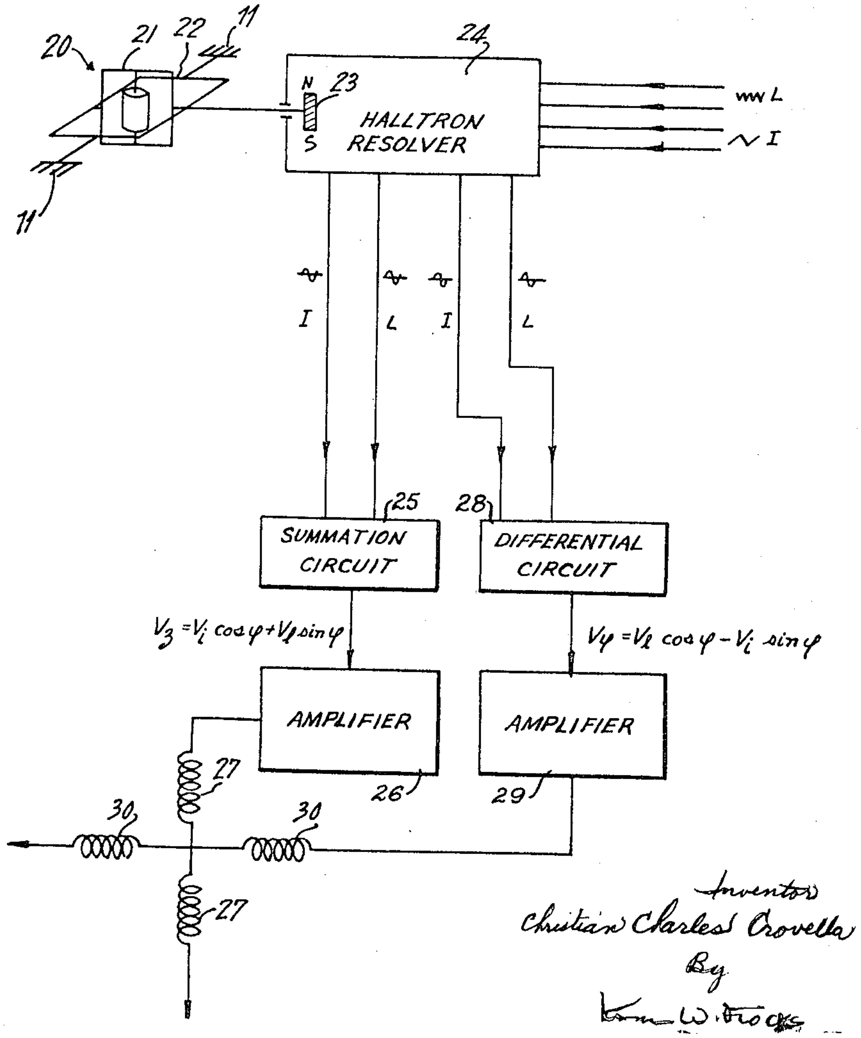
FIG. 6 shows the device for correcting rolling, with analysis of the image in a rectangle.

In the Halltron resolver which is a standard piece of equipment, comprising four Hall cells and is designated as a whole in FIG. 6 by reference 24, the magnetic field $\beta$ is created by the small permanent magnet 23 and is caused to rotate according to the rolling motion by means of the movement of the axis of gyroscope 20.

By virtue of a vertical gyroscope 20 suspended from the device by means of two cardan rings 21 and 22, the magnet 23, fixed on an extension of the axis of rotation of the inner ring 21 with respect to the outer ring 22, is practically stabilized in the vertical plane OYZ.

At the output of the resolver 24, the signals $V_1 \cos\varphi$ and $V_1 \sin\varphi$ are sent into a summation circuit 25, while the signals $V_1 \cos\varphi$ and $V_1 \sin\varphi$ are sent into a differential circuit 28. The two signals thus obtained are applied respectively to the deflection coils 27 and 30 which are additional deflection coils of the television camera tube 18 after the first has passed through the amplifier 26 and the second through the amplifier 29.

Figures 7, 8:
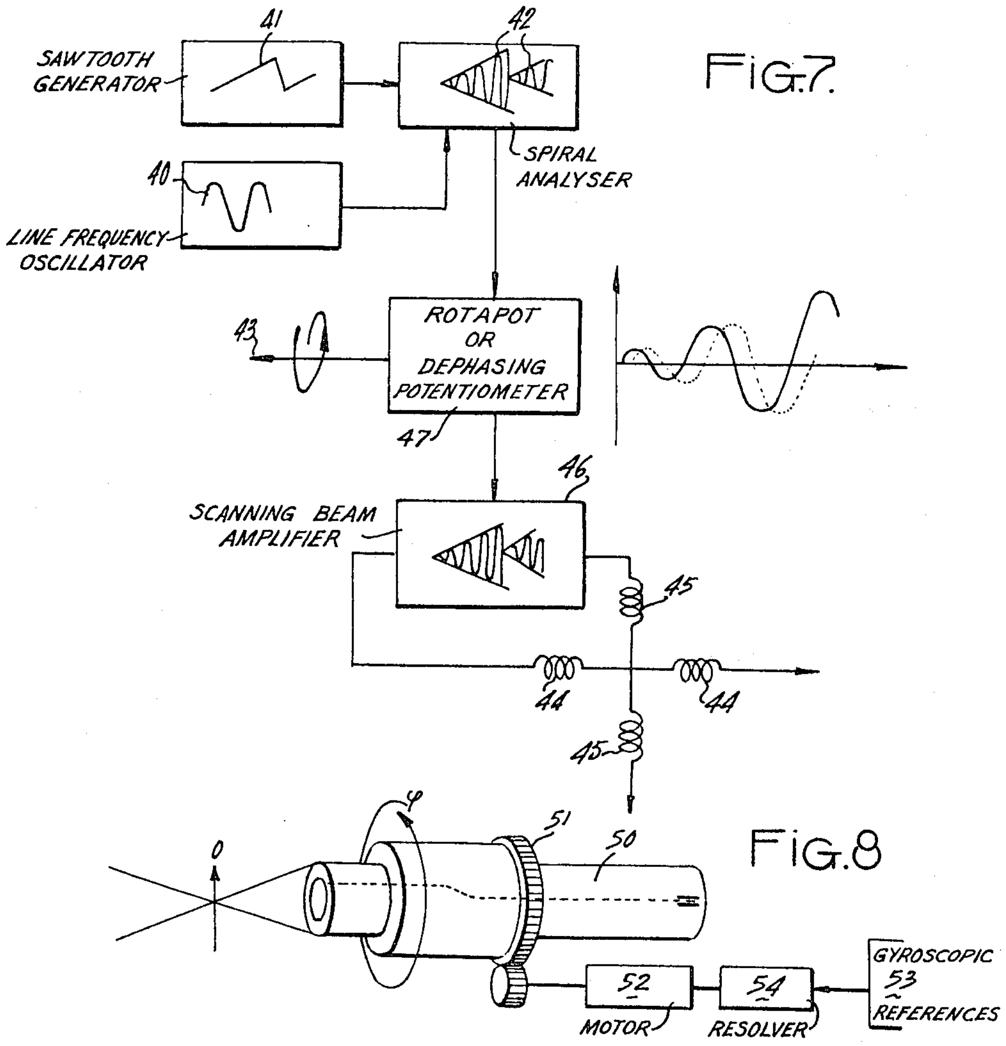
FIG. 7 shows the device for correction of rolling, with analysis of the image in a spiral.
FIG. 8 shows a diagram in which the deflection coils are controlled in dependence on the gyroscopic references.

If, as shown in FIG. 7, there is employed a spiral scan obtained from a sine wave 40 delivered by a line frequency oscillator, this sine wave is modulated in amplitude by a saw-tooth 41 which causes the scanning spot to describe a spiral 42, decreasing from the periphery towards the centre. The saw-tooth 41 and the sine wave 40 are phase-displaced in known manner by the "rotapot" or de-phasing potentiometer 47, the axis of which is coupled to a gyroscopic reference 43. The slider of the rotapot 47 explores the sinusoidal voltages from O to $2\pi$. These phase-displaced signals are applied to the deflection coils 44, 45 through the intermediary of the scanning beam amplifier 46.

In the alternative form, the corrections, in the case of an image of any scan frequency and shape, can be effected by causing rotation of the deflection coils by means of a control by a motor acting in dependence on the gyroscopic references supplied by a vertical reference gyrascope as in FIG. 6. FIG. 8 gives a very diagrammatic representation of such a circuit. There has been shown a television camera tube 50, a ring 51 fixed to the tube deflection coils, a motor 52 coupled to the gyroscopic references 53 through the intermediary of a resolver 54.

Figure 9:
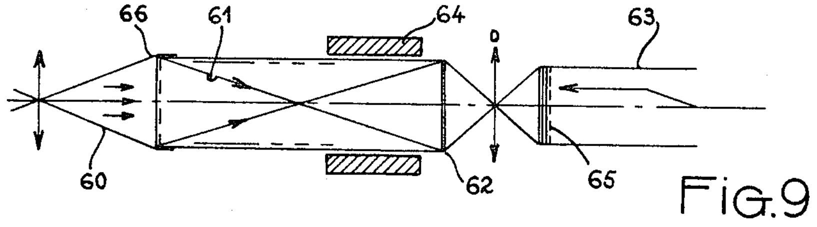
FIG. 9 shows a correction device for the image converter.

The method according to the invention may also be applied in the case of the image converter. In FIG. 9, the photons 60 are received on a photo-cathode 66 which converts them to electrons 61. They are accelerated, concentrated and thus excite the fluorescent layer 62 of the image converter. The electronic image formed in the tube 63 from the scanned optical image of the object to be picked up formed on the camera tube can be deflected by an external magnetic field acting on the deflection coils 64. This alternative can be produced in the form of a single tube combining all the above elements, the fluorescent coating 62 being stuck to the photo-conducting layer 65 of the camera tube 63.

It will of course be understood that the present invention has only been described by way of explanation and without any limitative sense, and that it is possible to introduce modifications of detail without thereby departing from its scope.

1. Apparatus for compensating for movements of the optical image produced in the tube of a television camera mounted aboard an aircraft and placed on a support rigidly secured to said aircraft, which movements of the optical image result from relative movements between the camera on its support and an object to be filmed due to movement of the aircraft about its pitching, rolling and yawing axes comprising gyroscopic means for detecting and measuring the angles of yawing, pitching, and rolling of the aircraft, a television camera rigidly mounted on a support secured to the aircraft for movement therewith, said television camera having a tube with electron gun means to produce an electron beam and deflecting coil means associated therewith, means connected to said gyroscopic means for forming and applying deviation voltages, said means supplying electrical signals which are a function of movement of said gyroscopic means to said deflecting coil means of said television camera tube, said gyroscopic means including at least one directional gyroscope having primary and secondary rings and freely mounted on said support secured to the aircraft with axes connected to said primary and secondary rings respectively to drive said means for forming and applying deviation voltages including detecting means for detecting the angles of pitching and yawing respectively, the output voltages of said detecting means being simultaneously applied with corresponding voltages at image frequency and line scanning frequency, respectively, to said deflecting coil means, said gyroscopic means also including a vertical gyroscope mounted on said aircraft and having a stabilized permanent magnet fixed to an axis of a ring of said vertical gyroscope corresponding to a stabilized vertical plane, the said axis being concident with the optical axis of said camera and the axis of rolling, said means for forming and applying deviation voltages further including a resolver subjected to the action of the magnetic field rotating in synchronism with the rolling movement and created by the magnet, input signals applied to said resolver to obtain an output from said resolver of signals modulated and dephased as a function of the instantaneous rotation about the rolling axis, and amplifier means connecting said output of said resolver to said deflecting coil means.

2. Apparatus according to claim 1 further characterized by said detecting means including a potentiometer slider under direct current voltage.

3. Apparatus according to claim 1 further characterized by said input signals applied to said resolver comprising sawtooth signals respectively at line frequency and image frequency from rectangular scanning generators, and said output signals from said resolver comprising sawtooth signals.

4. Apparatus according to claim 1 further characterized by said amplifier means including at least one differential amplifier means and one summation amplifier means connected to said resolver output to establish the respective horizontal and vertical deflection voltages from said signals modulated and dephased as a function of the instantaneous rotation about the rolling axis, and horizontal and vertical amplifiers respectively connected to said differential and summation amplifier means and to said deflecting coil means.

5. Apparatus according to claim 1 further characterized by said resolver operating by utilization of Hall effect.

References Cited

UNITED STATES PATENTS

| | | | |
|---|---|---|---|
| 2,869,803 | 1/1959 | McGee | 178—6 |
| 3,240,860 | 3/1966 | McCarthy | 74—5.6 |
| 3,261,912 | 7/1966 | Hemstreet | 178—6.8 |
| 3,240,942 | 3/1966 | Birnbaum | 178—6.8 |
| 3,293,360 | 12/1966 | Smith | 178—6 |

ROBERT L. GRIFFIN, *Primary Examiner.*

JOHN W. CALDWELL, DAVID G. REDINBAUGH, *Examiners.*

P. SPERBER, J. A. ORSINO, *Assistant Examiners.*